United States Patent
Abraham et al.

(10) Patent No.: US 9,948,367 B2
(45) Date of Patent: Apr. 17, 2018

(54) METHODS AND APPARATUS FOR ACKNOWLEDGING MULTIPLE USER UPLINK TRANSMISSIONS

(71) Applicant: QUALCOMM Incorporated, San Diego, CA (US)

(72) Inventors: Santosh Paul Abraham, San Diego, CA (US); Gwendolyn Denise Barriac, Encinitas, CA (US); Simone Merlin, San Diego, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 14/930,361

(22) Filed: Nov. 2, 2015

(65) Prior Publication Data

US 2016/0127020 A1    May 5, 2016

Related U.S. Application Data

(60) Provisional application No. 62/074,538, filed on Nov. 3, 2014.

(51) Int. Cl.
*H04W 4/06* (2009.01)
*H04B 7/0452* (2017.01)
(Continued)

(52) U.S. Cl.
CPC ......... *H04B 7/0452* (2013.01); *H04L 1/1607* (2013.01); *H04L 1/1829* (2013.01); *H04L 5/0007* (2013.01)

(58) Field of Classification Search
CPC ... H04L 1/1607; H04L 1/1829; H04L 5/0007; H04B 7/0452
See application file for complete search history.

(56) References Cited

U.S. PATENT DOCUMENTS

2008/0259891 A1*  10/2008  Dent .................... H04L 5/0053
                                                                        370/342
2011/0103280 A1*   5/2011  Liu .................... H04W 52/0229
                                                                        370/311
(Continued)

OTHER PUBLICATIONS

Fei Tong (CSR): "802.11 ah Multi-User Aggregation PDU; 11-12-0890-00-00ah-802-11ah-multi-user-aggregation-pdu", IEEE SA Mentor; 11-12-0890-00-00AH-802-11 AH-Multi-User-Aggregation-PDU, IEEE-SA Mentor, Piscataway, NJ USA, vol. 802:11 ah, Jul. 16, 2012 (Jul. 16, 2012), pp. 1-19, [retrieved on Jul. 16, 2012].
(Continued)

*Primary Examiner* — Abdelnabi O Musa
(74) *Attorney, Agent, or Firm* — Knobbe, Martens, Olson & Bear, LLP

(57) ABSTRACT

Methods and systems for acknowledging multi-user transmissions on a wireless network include receiving a multi-user transmission comprising a first message from the first device and a second message from the second device, generating a first media access control protocol data unit, the first media access control protocol data unit acknowledging the first message and including a destination address field identifying the first device, generating a second media access control protocol data unit, the second media access control protocol data unit acknowledging the second message and including a destination address field identifying the second device, generating an aggregated media access control protocol data unit (A-MPDU) comprising the first media access control protocol data unit (MPDU) and the second media access control protocol data unit (MPDU); and transmitting the aggregated media access control protocol data unit (A-MPDU) on the wireless network.

50 Claims, 8 Drawing Sheets

(51) Int. Cl.
*H04L 5/00* (2006.01)
*H04L 1/16* (2006.01)
*H04L 1/18* (2006.01)

(56) References Cited

U.S. PATENT DOCUMENTS

2013/0286959 A1* 10/2013 Lou ........................ H04W 72/04
370/329
2013/0301569 A1* 11/2013 Wang .................... H04L 5/0055
370/329
2015/0146654 A1* 5/2015 Chu .................. H04W 72/1289
370/329

OTHER PUBLICATIONS

International Search Report and Written Opinion—PCT/US2015/058825—ISA/EPO—Jan. 22, 2016.

* cited by examiner

METHODS AND APPARATUS FOR ACKNOWLEDGING MULTIPLE USER UPLINK TRANSMISSIONS

CROSS REFERENCE TO RELATED APPLICATIONS

This application claim priority to U.S. Provisional Application No. 62/074,538, filed Nov. 3, 2014, and entitled "METHODS AND APPARATUS FOR ACKNOWLEDGING MULTIPLE USER UPLINK TRANSMISSIONS." The disclosure of this prior application is considered part of this application, and is hereby incorporated by reference in its entirety.

BACKGROUND

Field

Certain aspects of the present disclosure generally relate to wireless communications, and more particularly, to methods and apparatus for multiple user uplink communication in a wireless network.

Background

In many telecommunication systems, communications networks are used to exchange messages among several interacting spatially-separated devices. Networks may be classified according to geographic scope, which could be, for example, a metropolitan area, a local area, or a personal area. Such networks may be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks advantageously facilitate user mobility and rapid field deployment when compared to fixed wired networks.

In order to address the issue of increasing bandwidth requirements that are demanded for wireless communications systems, different schemes are being developed to allow multiple user terminals to communicate with a single access point by sharing the channel resources while achieving high data throughputs. With limited communication resources, it is desirable to reduce the amount of traffic passing between the access point and the multiple terminals. For example, when multiple terminals send uplink communications to the access point, it is desirable to minimize the amount of traffic to complete the uplink of all transmissions. Thus, there is a need for an improved protocol for uplink transmissions from multiple terminals.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method of acknowledging transmissions from a first device and a second device on a wireless network. The method includes receiving, by a transmission opportunity owner, a multi-user transmission comprising a first message from the first device and a second message from the second device, generating, by the transmission opportunity owner, a first media access control protocol data unit, the first media access control protocol data unit acknowledging reception of the first message and including a first destination address field identifying the first device, generating, by the transmission opportunity owner, a second media access control protocol data unit, the second media access control protocol data unit acknowledging reception of the second message and including a second destination address field identifying the second device, generating, by the transmission opportunity owner, an aggregated media access control protocol data unit (A-MPDU) comprising the first media access control protocol data unit (MPDU) and the second media access control protocol data unit (MPDU), and transmitting, by the transmission opportunity owner, the aggregated media access control protocol data unit (A-MPDU) on the wireless network.

Some aspects of the method further include receiving the multi-user transmission using multi-user multiple input multiple output (MU-MIMO) or orthogonal frequency division multiplexing (OFDM). Some aspects of the method further include generating the aggregated media access control to comprise an indicator indicating whether the aggregated media access control protocol data unit (A-MPDU) includes more than one media access control protocol data units having different destination address fields. In some aspects, the multi-user transmission further includes a third message from a third device. In these aspects, the method further includes generating a third media access control protocol data unit, the third media access control protocol data unit acknowledging the third message and including a third destination address field identifying the third device; and generating the aggregated media access control protocol data unit (A-MPDU) to further include the third media access control protocol data unit (MPDU).

Some aspects of the method further include transmitting a trigger message, the trigger message comprising an indicator of a time when the multi-user transmission occurs.

Another aspect disclosed is an apparatus for acknowledging a multi-user transmission from a first device and a second device on a wireless network. The apparatus includes a receiver configured to receive a first message from the first device and a second message from the second device, a processor configured to generate a first media access control protocol data unit, the first media access control protocol data unit acknowledging the first message and including a destination address field identifying the first device, generate a second media access control protocol data unit, the second media access control protocol data unit acknowledging the second message and including a destination address field identifying the second device, and generate an aggregated media access control protocol data unit (A-MPDU) comprising the first media access control protocol data unit (MPDU) and the second media access control protocol data unit (MPDU). The apparatus also includes a transmitter configured to transmit the aggregated media access control protocol data unit (A-MPDU) on the wireless network.

In some aspects of the apparatus, the receiver is further configured to receive the multi-user transmission using multi-user multiple input multiple output (MU-MIMO) or orthogonal frequency division multiplexing (OFDM). In some aspects of the apparatus, the processor is further configured to generate the aggregated media access control to comprise an indicator indicating whether the aggregated media access control protocol data unit (A-MPDU) includes more than one media access control protocol data unit having different destination address fields. In some aspects of the apparatus the multi-user transmission further includes a third message from a third device, and the processor is further configured to generate a third media access control protocol data unit, the third media access control protocol data unit acknowledging reception of the third message and including a destination address field identifying the third device, and generate the aggregated media access control protocol data unit (A-MPDU) to further include the third media access control protocol data unit (MPDU). In some aspects of the apparatus the transmitter is further configured to transmit a trigger message, the trigger message comprising an indicator of a time when the multi-user transmission occurs.

Another aspect disclosed is an apparatus for acknowledging a multi-user transmission from a first device and a second device on a wireless network. The apparatus includes means for receiving a multi-user transmission comprising a first message from the first device and a second message from the second device, means for generating a first media access control protocol data unit, the first media access control protocol data unit acknowledging reception of the first message and including a destination address field identifying the first device, means for generating a second media access control protocol data unit, the second media access control protocol data unit acknowledging reception of the second message and including a destination address field identifying the second device, means for generating an aggregated media access control protocol data unit (A-MPDU) comprising the first media access control protocol data unit (MPDU) and the second media access control protocol data unit (MPDU), and means for transmitting the aggregated media access control protocol data unit (A-MPDU) on the wireless network. Some aspects of the apparatus also include means for receiving the multi-user transmission using multi-user multiple input multiple output (MU-MIMO) or orthogonal frequency division multiplexing (OFDM). Some aspects of the apparatus also include means for generating the aggregated media access control protocol data unit to comprise an indicator indicating whether the aggregated media access control protocol data unit (A-MPDU) includes more than one media access control protocol data unit having different destination address fields. In some aspects of the apparatus, the multi-user transmission further includes a third message from a third device. In these aspects, the apparatus also includes means for generating a third media access control protocol data unit, the third media access control protocol data unit acknowledging reception of the third message and including a destination address field identifying the third device; and means for generating the aggregated media access control protocol data unit (A-MPDU) to further includes the third media access control protocol data unit (MPDU). Some aspects of the apparatus also include means for transmitting a trigger message, the trigger message comprising an indicator of a time when the multi-user transmission occurs.

Another aspect disclosed is a computer readable storage medium comprising instructions that when executed cause a processor to perform a method of acknowledging transmissions from a first device and a second device on a wireless network. The method includes receiving, by a transmission opportunity owner, a multi-user transmission comprising a first message from the first device and a second message from the second device, generating, by the transmission opportunity owner, a first media access control protocol data unit, the first media access control protocol data unit acknowledging reception of the first message and including a destination address field identifying the first device, generating, by the transmission opportunity owner, a second media access control protocol data unit, the second media access control protocol data unit acknowledging reception of the second message and including a destination address field identifying the second device, generating, by the transmission opportunity owner, an aggregated media access control protocol data unit (A-MPDU) comprising the first media access control protocol data unit (MPDU) and the second media access control protocol data unit (MPDU), and transmitting, by the transmission opportunity owner, the aggregated media access control protocol data unit (A-MPDU) on the wireless network.

Some aspects of the method of the computer readable storage medium further include receiving the multi-user transmission using multi-user multiple input multiple output (MU-MIMO) or orthogonal frequency division multiplexing (OFDM). Some aspects of the method of the computer readable storage medium further include generating the aggregated media access control to comprise an indicator indicating whether the aggregated media access control protocol data unit (A-MPDU) includes at least two media access control protocol data units having different destination address fields. In some aspects, the multi-user transmission further includes a third message from a third device. In these aspects, the method of the computer readable storage medium further includes generating a third media access control protocol data unit, the third media access control protocol data unit acknowledging reception of the third message and including a destination address field identifying the third device; and generating the aggregated media access control protocol data unit (A-MPDU) to further include the third media access control protocol data unit (MPDU).

Some aspects of the method of the computer readable storage medium further include transmitting a trigger message, the trigger message comprising an indicator of a time when the multi-user transmission occurs.

Another aspect disclosed is a method of wireless communication. The method includes transmitting, by a device, a message to a transmission opportunity owner, the message comprising a portion of a multi-user transmission, receiving an aggregated media access control protocol data unit from the transmission opportunity owner, decoding at least portions of two media access control protocol data units from the aggregated media access control protocol data unit; and determining whether the message is acknowledged by one of the decoded media access control protocol data units. In some aspects, the method also includes transmitting the message using multi-user multiple input multiple output (MU-MIMO) or orthogonal frequency division multiplexing (OFDM). In some aspects, the method also includes determining whether the device is unicast addressed by a media access control protocol data unit, and determining the one media access control protocol data unit based on the device being unicast addressed by the one media access control protocol data unit. In some aspects, the method also includes determining the aggregated media access control protocol data unit (A-MPDU) is acknowledging reception of the multi-user transmission, wherein the at least two media access control protocol data units are decoded from the aggregated media access control protocol data unit in response to the determination. In some aspects, the method also includes decoding an indicator included in the aggregated media access control protocol data unit (A-MPDU) to determine the aggregated media access control protocol data unit (A-MPDU) is acknowledging reception of the multi-user transmission.

In some aspects, the method also includes receiving a trigger message, determining a time to initiate transmission of the message based on the trigger message; and transmitting the message at the determined time. In some aspects, the method also includes decoding a trigger message to determine a time reference for acknowledgment of the message; and entering a sleep state based on the time reference.

Another aspect disclosed is an apparatus for wireless communication. The apparatus includes a transmitter configured to transmit a message to a transmission opportunity owner, the message comprising a portion of a multi-user transmission, a receiver configured to receive an aggregated media access control protocol data unit from the transmission opportunity owner; and a processor configured to: decode at least portions of two media access control protocol data units from the aggregated media access control protocol data unit, and determine whether the message is acknowledged by one of the decoded media access control protocol data units.

In some aspects of the apparatus, the transmitter is further configured to transmit the message using multi-user multiple input multiple output (MU-MIMO) or orthogonal frequency division multiplexing (OFDM). In some aspects of the apparatus, the processor is further configured to determine whether the device is unicast addressed by the at least two media access control protocol data units, and determine the one media access control protocol data unit based on the device being unicast addressed by the one media access control protocol data unit.

In some aspects of the apparatus, the processor is further configured to determine the aggregated media access control protocol data unit (A-MPDU) is acknowledging reception of the multi-user transmission, wherein the at least two media access control protocol data units are decoded from the aggregated media access control protocol data unit in response to the determination. In some aspects of the apparatus, the processor is further configured to decode an indicator included in the aggregated media access control protocol data unit (A-MPDU) to determine the aggregated media access control protocol data unit (A-MPDU) is acknowledging reception of the multi-user transmission. In some aspects of the apparatus, the receiver is further configured to receive a trigger message, and the processor is further configured to determine a time to initiate transmission of the message based on the trigger message, and the transmitter is further configured to transmit the message at the determined time.

Another aspect disclosed is an apparatus for wireless communication. The apparatus includes means for transmitting a message to a transmission opportunity owner, the message comprising a portion of a multi-user transmission, means for receiving an aggregated media access control protocol data unit from the transmission opportunity owner, means for decoding at least portions of two media access control protocol data units from the aggregated media access control protocol data unit; and means for determining whether the message is acknowledged by one of the decoded media access control protocol data units. In some aspects, the apparatus also includes means for transmitting the message using multi-user multiple input multiple output (MU-MIMO) or orthogonal frequency division multiplexing (OFDM). In some aspects, the apparatus also includes means for determining whether the device is unicast addressed by the two media access control protocol data units, and determining the one media access control protocol data unit based on the device being unicast addressed by the one media access control protocol data unit. In some aspects, the apparatus also includes means for determining the aggregated media access control protocol data unit (A-MPDU) is acknowledging reception of the multi-user transmission, wherein the two media access control protocol data units are decoded from the aggregated media access control protocol data unit in response to the determination. In some aspects, the method also includes means for decoding an indicator included in the aggregated media access control protocol data unit (A-MPDU) to determine the aggregated media access control protocol data unit (A-MPDU) is acknowledging reception of the multi-user transmission. In some aspects, the apparatus also includes means for receiving a trigger message, means for determining a time to initiate transmission of the message based on the trigger message, and means for transmitting the message at the determined time.

Another aspect disclosed is a computer readable storage medium comprising instructions that when executed cause a processor to perform a method of wireless communication. The method includes transmitting, by a device, a message to a transmission opportunity owner, the message comprising a portion of a multi-user transmission, receiving an aggregated media access control protocol data unit from the transmission opportunity owner, decoding at least portions of two media access control protocol data units from the aggregated media access control protocol data unit; and determining whether the message is acknowledged by one of the decoded media access control protocol data units. In some aspects of the computer readable storage medium, the method also includes transmitting the message using multi-user multiple input multiple output (MU-MIMO) or orthogonal frequency division multiplexing (OFDM). In some aspects of the computer readable storage medium, the method also includes determining whether the device is unicast addressed by the two media access control protocol data units, and determining the one media access control protocol data unit based on the device being unicast addressed by the one media access control protocol data unit. In some aspects of the computer readable storage medium, the method also includes determining the aggregated media access control protocol data unit (A-MPDU) is acknowledging reception of the multi-user transmission, wherein the two media access control protocol data units are decoded from the aggregated media access control protocol data unit in response to the determination. In some aspects of the computer readable storage medium, the method also includes decoding an indicator included in the aggregated media access control protocol data unit (A-MPDU) to determine the aggregated media access control protocol data unit (A-MPDU) is acknowledging reception of the multi-user transmission. In some aspects of the computer readable storage medium, the method also includes receiving a trigger message, determining a time to initiate transmission of the message based on the trigger message; and transmitting the message at the determined time.

DETAILED DESCRIPTION

Figure 1:
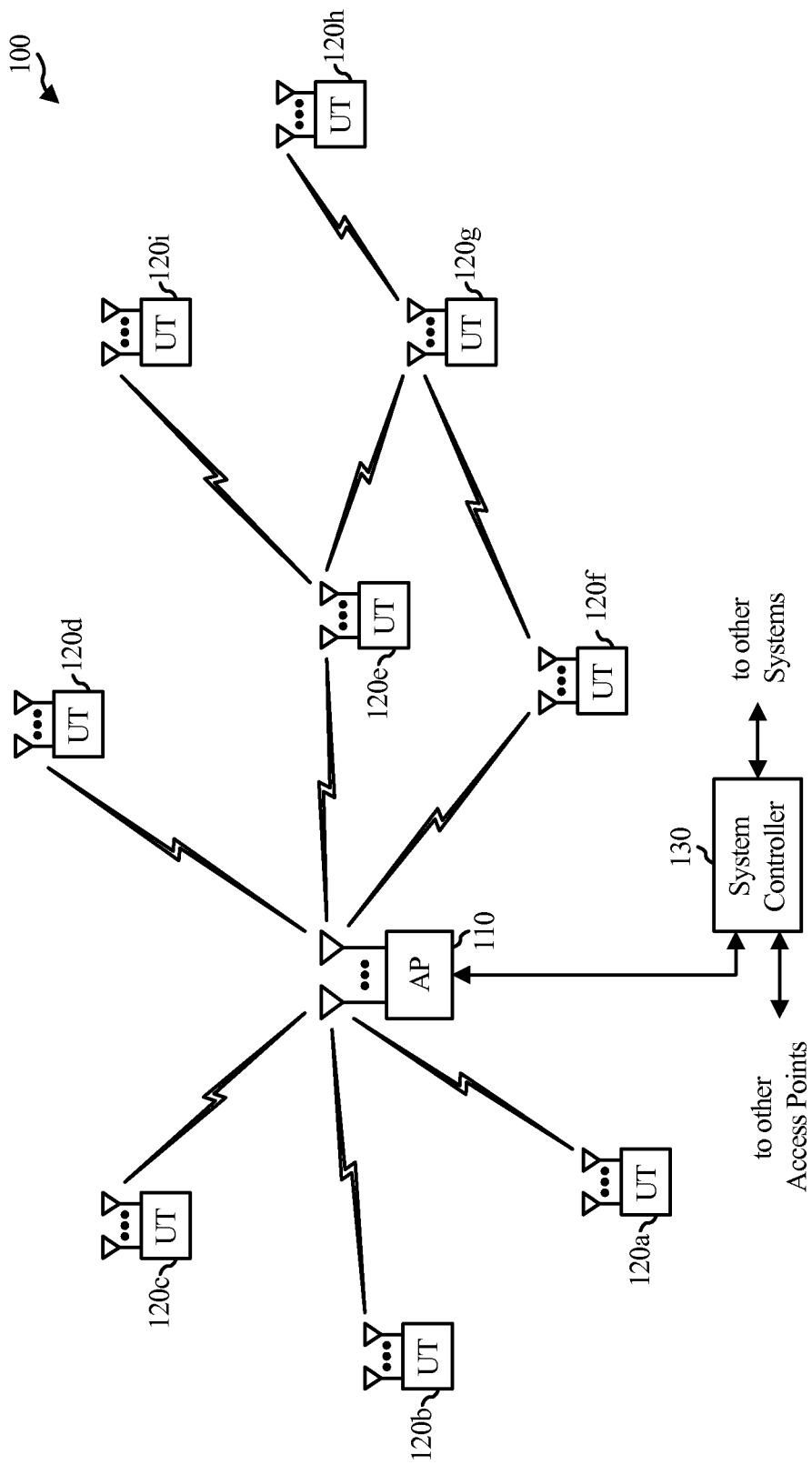
FIG. 1 illustrates a system with access points and user terminals.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols.

In some aspects, wireless signals may be transmitted according to a high-efficiency 802.11 protocol using orthogonal frequency-division multiplexing (OFDM), direct-sequence spread spectrum (DSSS) communications, a combination of OFDM and DSSS communications, or other schemes. Implementations of the high-efficiency 802.11 protocol may be used for Internet access, sensors, metering, smart grid networks, or other wireless applications. Advantageously, aspects of certain devices implementing this particular wireless protocol may consume less power than devices implementing other wireless protocols, may be used to transmit wireless signals across short distances, and/or may be able to transmit signals less likely to be blocked by objects, such as humans.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, a STA may be a laptop computer, a personal digital assistant (PDA), a mobile phone, etc. In an example, an STA connects to an AP via a Wi-Fi (e.g., IEEE 802.11 protocol such as 802.11ah) compliant wireless link to obtain general connectivity to the Internet or to other wide area networks. In some implementations an STA may also be used as an AP.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE (3rd Generation Partnership Project Long Term Evolution) or other standards.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station "STA" may also comprise, be implemented as, or known as a user terminal, an access terminal ("AT"), a subscriber station, a subscriber unit, a mobile station, a remote station, a remote terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The methods and systems disclosed acknowledge a multi-user transmission, which may be performed in some aspects by multi-user multiple input multiple output (MU-MIMO) or orthogonal frequency division multiplexing (OFDM) on a wireless network by using an aggregated media access control protocol data unit (A-MPDU). In some aspects, the A-MPDU includes an MPDU for each message included in the multi-user transmission, with each MPDU functioning to acknowle a corresponding message in the multi-user transmission. Each of the MPDUs may be addressed to a particular device that transmitted a message the MPDU is acknowledging. When the A-MPDU is received, each device may decode each of the MPDUs to identify if any of the MPDUs included in the A-MPDU addresses the particular device. If an MPDU is addressed to the decoding device, the device may then determine whether the MPDU is acknowledging its portion of the multi-user transmission.

FIG. 1 is a diagram that illustrates a system 100 with access points and user terminals. For simplicity, only one access point 110 is shown in FIG. 1. An access point is generally a fixed station that communicates with the user terminals and may also be referred to as a base station or using some other terminology. A user terminal or STA may be fixed or mobile and may also be referred to as a mobile station or a wireless device, or using some other terminology. The access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, the AP 110 may be configured to communicate with both SDMA and non-SDMA user terminals. This approach may conveniently allow older versions of user terminals ("legacy" stations) that do not support SDMA to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 (or stations or STAs) collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of sub-bands with OFDM, and so on. Each selected user terminal may transmit user-specific data to and/or receive user-specific data from the access point. In general, each selected user terminal may be equipped with one or multiple antennas (i.e., $N_{ut} \geq 1$). The K selected user terminals can have the same number of antennas, or one or more user terminals may have a different number of antennas.

The system 100 may be a time division duplex (TDD) system or a frequency division duplex (FDD) system. For a TDD system, the downlink and uplink share the same frequency band. For an FDD system, the downlink and uplink use different frequency bands. The system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, where each time slot may be assigned to a different user terminal 120.

Figure 2:
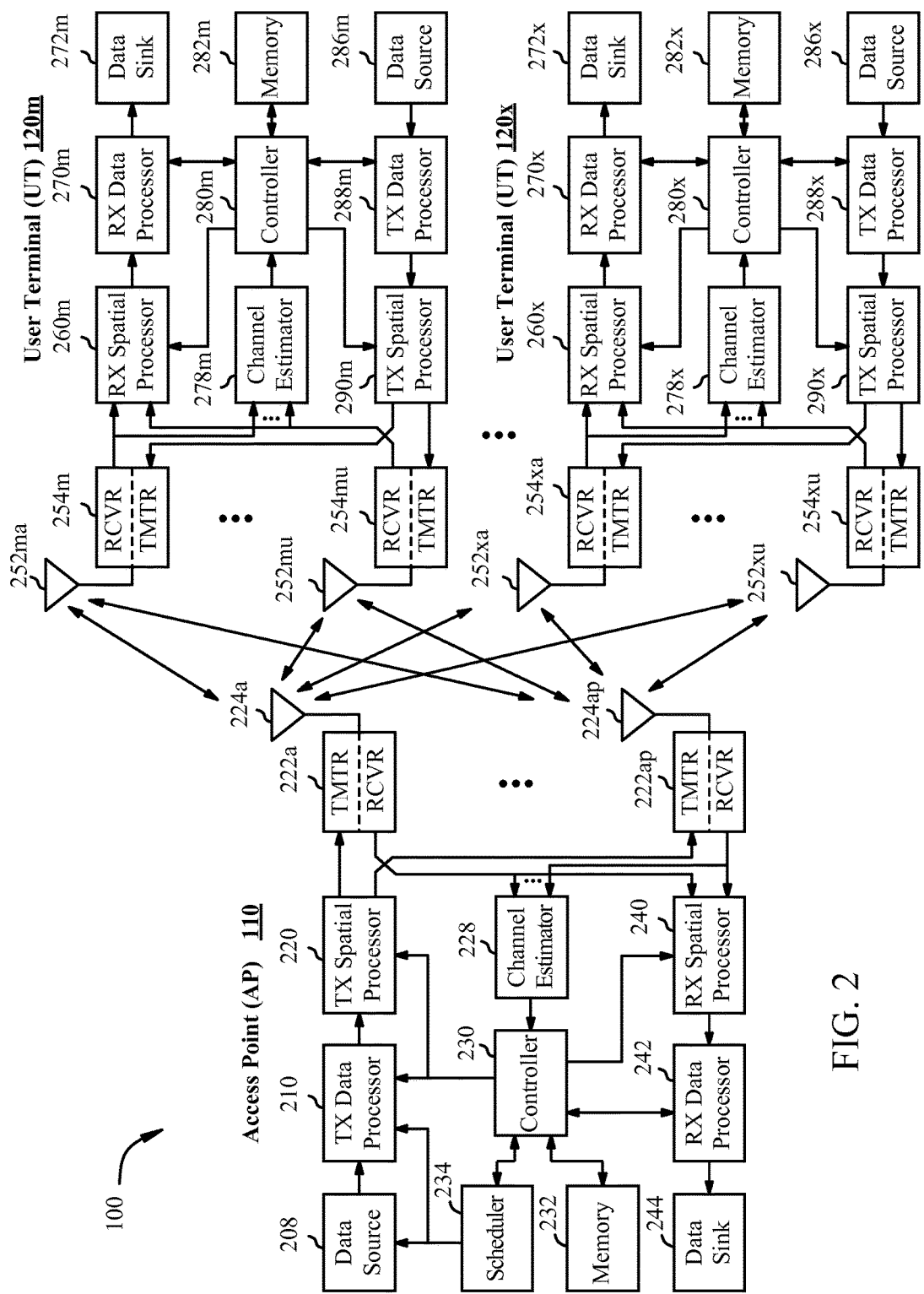
FIG. 2 illustrates a block diagram of the access point 110 and two user terminals 120m and 120x in a MIMO system.

FIG. 2 illustrates a block diagram of the access point 110 and two user terminals 120m and 120x in system 100. The access point 110 is equipped with $N_t$ antennas 224a through 224ap. The user terminal 120m is equipped with $N_{ut,m}$ antennas $252_{ma}$ through $252_{mu}$, and the user terminal 120x is equipped with $N_{ut,x}$ antennas $252_{xa}$ through $252_{xu}$. The access point 110 is a transmitting entity for the downlink and a receiving entity for the uplink. The user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, and $N_{dn}$ user terminals are selected for simultaneous transmission on the downlink. $N_{up}$ may or may not be equal to $N_{dn}$, and $N_{up}$ and $N_{dn}$ may be static values or may change for each scheduling interval. Beam-steering or some other spatial processing technique may be used at the access point 110 and/or the user terminal 120.

On the uplink, at each user terminal 120 selected for uplink transmission, a TX data processor 288 receives traffic data from a data source 286 and control data from a controller 280. The TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252, for example to transmit to the access point 110.

$N_{up}$ user terminals may be scheduled for simultaneous transmission on the uplink. Each of these user terminals may perform spatial processing on its respective data symbol stream and transmit its respective set of transmit symbol streams on the uplink to the access point 110.

At the access point 110, $N_{up}$ antennas 224a through $224_{ap}$ receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. A receive (RX) spatial processor 240 performs receiver spatial processing on the $N_{up}$ received symbol streams from $N_{up}$ receiver units 222 and provides $N_{up}$ recovered uplink data symbol streams. The receiver spatial processing may be performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at the access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. The TX data processor 210 provides $N_{dn}$ downlink data symbol streams for the $N_{dn}$ user terminals. A TX spatial processor 220 performs spatial processing (such as a precoding or beamforming) on the $N_{dn}$ downlink data symbol streams, and provides $N_{up}$ transmit symbol streams for the $N_{up}$ antennas. Each transmitter unit 222 receives and processes a respective transmit symbol stream to generate a downlink signal. $N_{up}$ transmitter units 222 may provide $N_{up}$ downlink signals for transmission from $N_{up}$ antennas 224, for example to transmit to the user terminals 120.

At each user terminal 120, $N_{ut,m}$ antennas 252 receive the $N_{up}$ downlink signals from the access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal 120. The receiver spatial processing may be performed in accordance with the CCMI, MMSE, or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, signal to noise ratio (SNR) estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. The controller 280 for each user terminal may send feedback information (e.g., the downlink and/or uplink eigenvectors, eigenvalues, SNR estimates, and so on) to the access point 110. The controllers 230 and 280 may also control the operation of various processing units at the access point 110 and user terminal 120, respectively.

Figure 3:
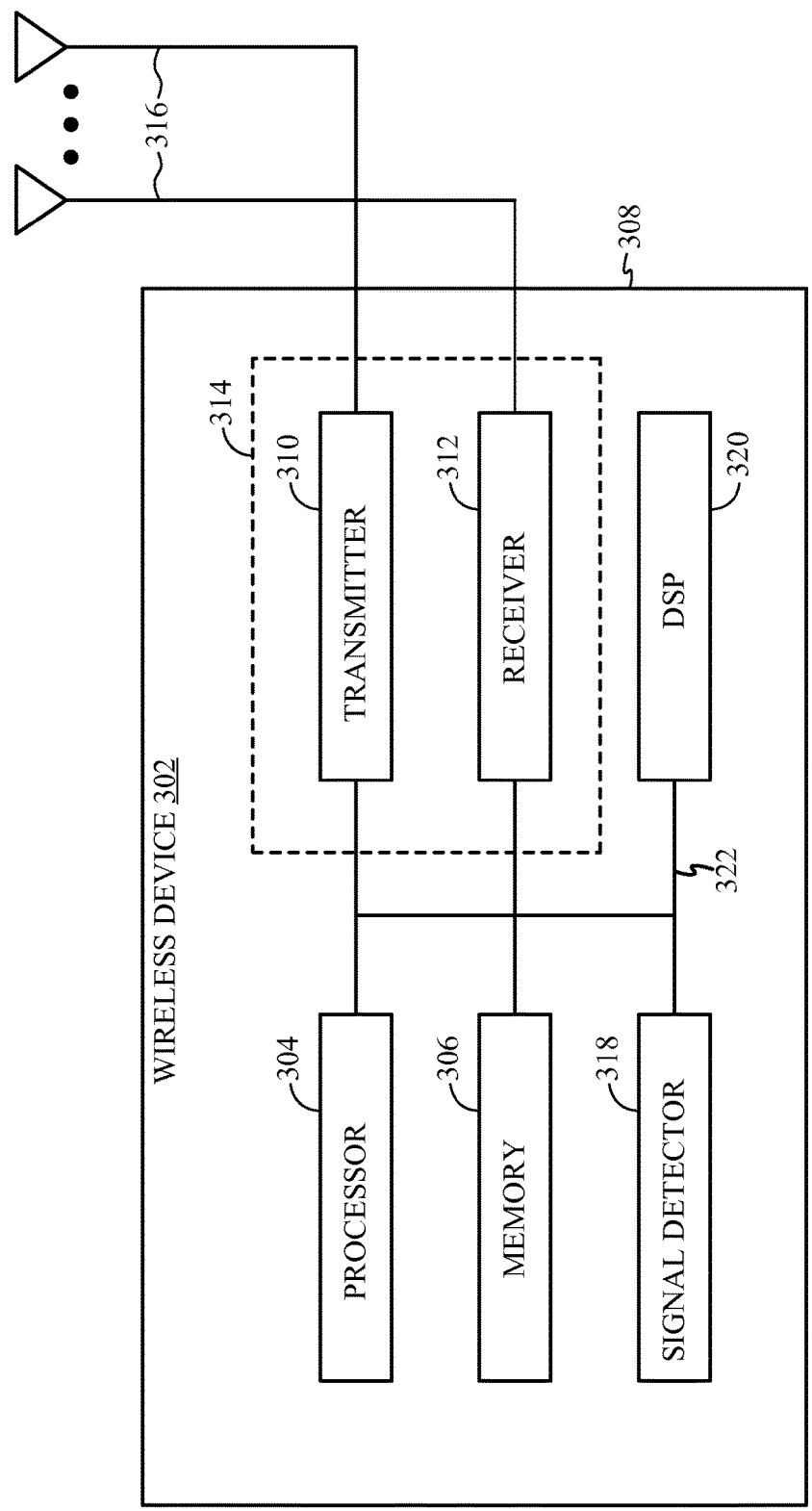
FIG. 3 illustrates various components that may be utilized in a wireless device that may be employed within a wireless communication system.

FIG. 3 illustrates various components that may be utilized in a wireless device 302 that may be employed within the system 100. The wireless device 302 is an example of a device that may be configured to implement the various methods described herein. The wireless device 302 may implement an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 may perform logical and arithmetic operations based on program instructions stored within the memory 306. The instructions in the memory 306 may be executable to implement the methods described herein.

The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transceiver antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Certain aspects of the present disclosure support transmitting an uplink (UL) signal from multiple STAs to an AP. In some embodiments, the UL signal may be transmitted in a multi-user multiple input multiple output (MIMO) (MU-MIMO) system. Alternatively, the UL signal may be transmitted in a multi-user FDMA (MU-FDMA) or similar FDMA system. Specifically, FIGS. 4-8, and 10 illustrate UL-MU-MIMO transmissions 410A, 410B, 1050A, and 1050B that would apply equally to UL-FDMA transmissions. In these embodiments, UL-MU-MIMO or UL-FDMA transmissions can be sent simultaneously from multiple STAs to an AP and may create efficiencies in wireless communication.

An increasing number of wireless and mobile devices put increasing stress on bandwidth requirements that are demanded for wireless communications systems. With limited communication resources, it is desirable to reduce the amount of traffic passing between the AP and the multiple STAs. For example, when multiple terminals send uplink communications to the access point, it is desirable to minimize the amount of traffic to complete the uplink of all transmissions. Thus, embodiments described herein support utilizing communication exchanges, scheduling and certain frames for increasing throughput of uplink transmissions to the AP.

Figure 4:
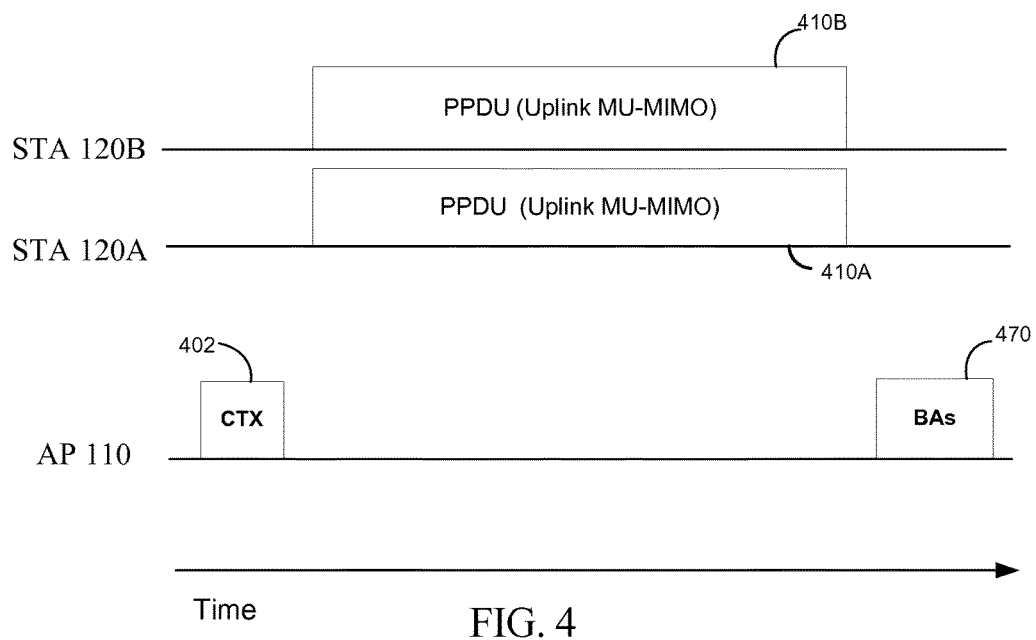
FIG. 4 shows a time diagram of an example frame exchange of an uplink (UL) MU-MIMO communication.

FIG. 4 is a time sequence diagram illustrating an example of an UL-MU-MIMO protocol or an UL-OFDMA protocol 400 that may be used for UL communications. As shown in FIG. 4 and in conjunction with FIG. 1, the AP 110 may transmit a clear to transmit (CTX) message 402 to the user terminals 120a-b indicating which STAs may participate in the uplink, such that a particular STA knows to start an uplink transmission. In some embodiments, the CTX message may be transmitted in a payload portion of a physical layer convergence protocol (PLCP) protocol data units (PPDUs). An example of a CTX frame structure is described more fully below with reference to FIG. 5.

Once a user terminal 120 receives a CTX message 402 from the AP 110 where the user terminal is listed, the user terminal may transmit the UL-MU-MIMO transmission 410. In FIG. 4, STA 120A and STA 120B transmit UL-MU-MIMO transmission 410A and 410B containing physical layer convergence protocol (PLCP) protocol data units (PPDUs). Upon receiving the UL-MU-MIMO transmission 410, the AP 110 may transmit block acknowledgments (BAs) 470 to the user terminals 120. An example of block acknowledgments (BAs) 470 is described more fully below with reference to FIG. 6.

Figure 5:
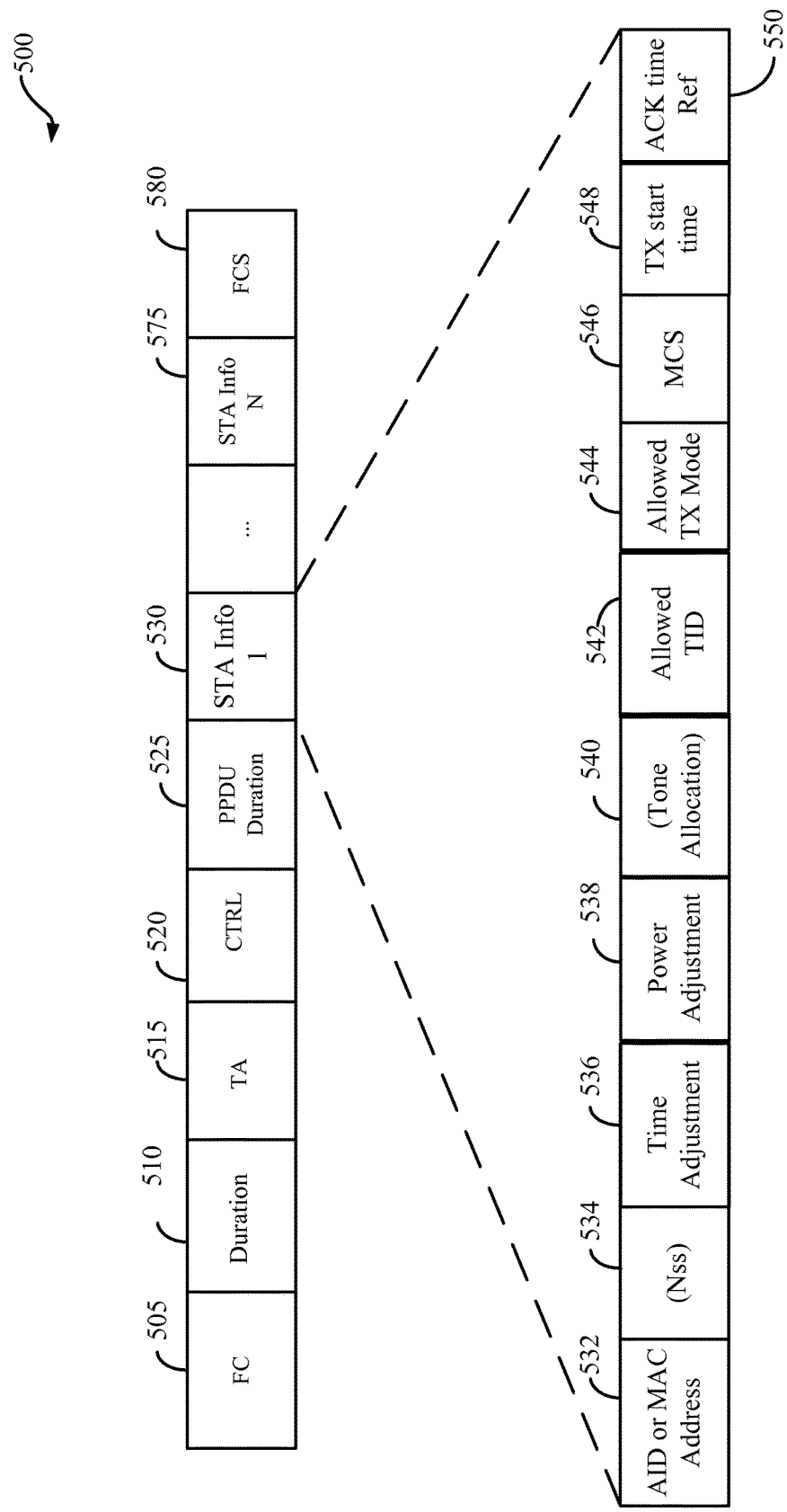
FIG. 5 shows a diagram of one embodiment of a clear to transmit (CTX) frame.

As discussed above, the CTX message 402 may be used in a variety of communications. FIG. 5 is a diagram of an example of a CTX frame 500 structure. In this embodiment, the CTX frame 500 is a control frame that includes a frame control (FC) field 505, a duration field 510, a transmitter address (TA) field 515, a control (CTRL) field 520, a PPDU duration field 525, a STA information (info) field 530, and a frame check sequence (FCS) field 580. The frame control (FC) field 505 indicates a control subtype or an extension subtype. The duration field 510 indicates to any receiver of the CTX frame 500 to set the network allocation vector (NAV). The TA field 515 indicates the transmitter address or a basic service set identifier (BSSID). The CTRL field 520 is a generic field that may include information regarding the format of the remaining portion of the frame (e.g., the number of STA info fields and the presence or absence of any subfields within a STA info field), indications for rate adaptation for the user terminals 120, indication of allowed traffic identifier (TID), and indication that a clear to send (CTS) must be sent immediately following the clear to transmit (CTX) frame 500. The indications for rate adaptation may include data rate information, such as a number indicating how much the STA should lower their modulation and coding schemes (MCSs), compared to the MCS the STA would have used in a single user transmission. The CTRL field 520 may also indicate if the CTX frame 500 is being used for UL MU MIMO or for UL FDMA or both, indicating whether a Nss or Tone allocation field is present in the STA Info field 530.

Alternatively, the indication of whether the CTX is for UL MU MIMO or for UL FDMA can be based on the value of the subtype. Note that UL MU MIMO and UL FDMA operations can be jointly performed by specifying to a STA both the spatial streams to be used and the channel to be used, in which case both fields are present in the CTX; in this case, the Nss indication is referred to a specific tone allocation. The PPDU duration field 525 indicates the duration of the following UL-MU-MIMO PPDU that the user terminals 120 are allowed to send. The STA Info field 530 contains information regarding a particular STA and may include a per-STA (per user terminal 120) set of information (see STA Info 1 530 and STA Info N 575). The STA Info 530 field may include an association identifier (AID) or media access control (MAC) address field 532 which identifies a STA, a number of spatial streams field (Nss) 534 field which indicates the number of spatial streams a STA may use (in an UL-MU-MIMO system), a Time Adjustment 536 field which indicates a time that a STA should adjust its transmission compared to the reception of a trigger frame (the CTX in this case), a Power Adjustment 538 field which indicates a power backoff a STA should take from a declared transmit power, a Tone Allocation 540 field which indicates the tones or frequencies a STA may use (in a UL-FDMA system), an Allowed TID 542 field which indicates the allowable TID, an Allowed TX Mode 544 field which indicates the allowed TX modes. In some embodiments, the allowed TX modes may include a short/long guard interval (GI) or cyclic prefix mode, a binary convolutional code (BCC)/low density parity check (LDPC) mode (generally, a coding mode), or a space-time block coding (STBC) mode. The STA info field 530 may also include a MCS 546 field which indicates the MCS the STA should use, and a TX start time field 548 which indicates a time reference for the STA to initiate or start transmission of uplink data. The STA info field 530 may also include an acknowledgement time reference field 550. The acknowledgment time reference field 550 may indicate a time that an acknowledgment of transmissions following the frame 500 may be acknowledged.

Figure 6:
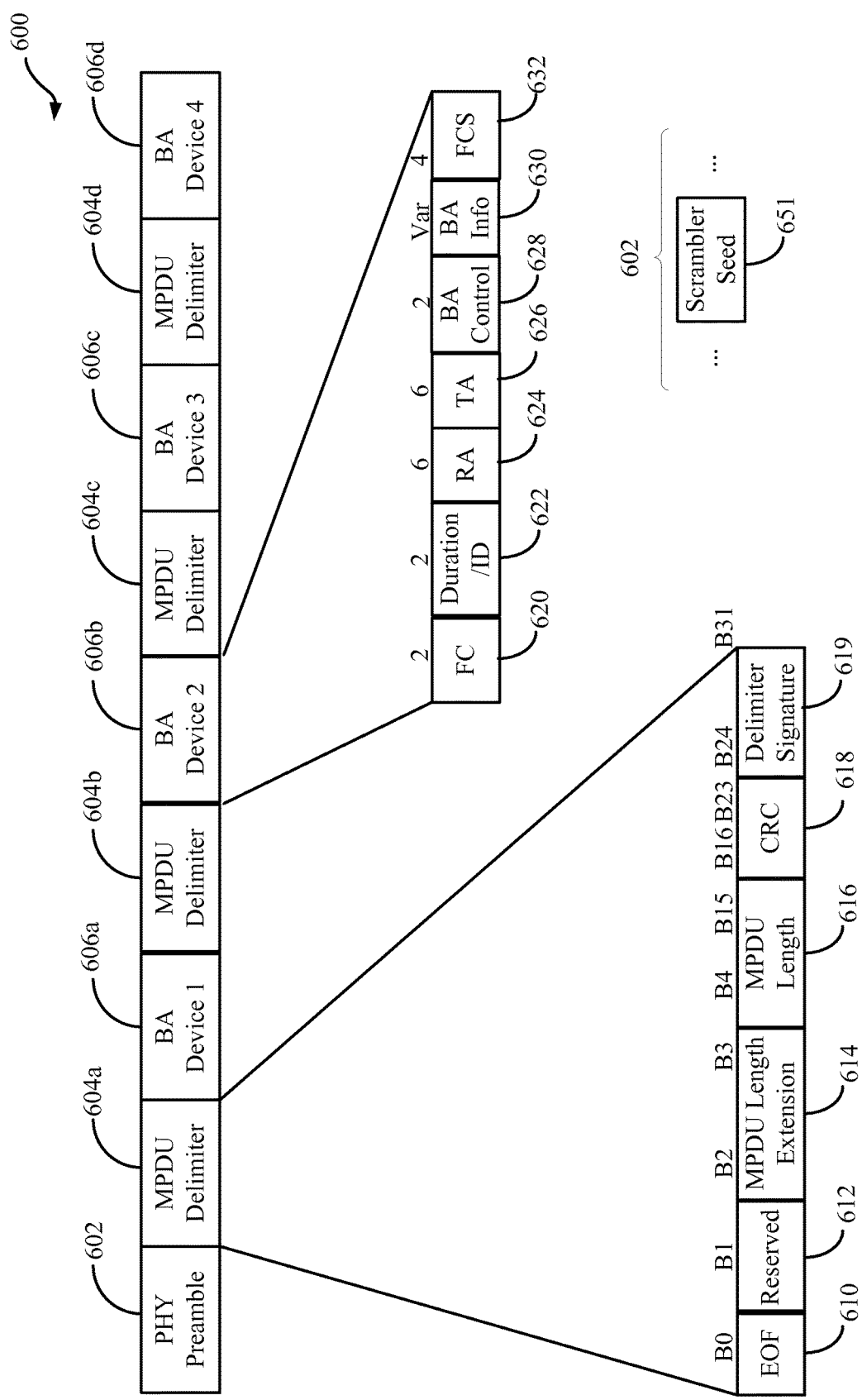
FIG. 6 shows a diagram of one embodiment of a block acknowledgment frame.

FIG. 6 is a diagram of a non-limiting example aggregated media access control (MAC) protocol data unit (A-MPDU)

acknowledgment frame 600 structure. In some aspects, the block acknowledgements 470 shown in FIG. 4 may substantially conform with the format of A-MPDU acknowledgment frame 600.

The non-limiting example A-MPDU acknowledgment frame 600 includes a physical layer preamble 602, MPDU delimiter fields 604a-d and block acknowledgment MPDUs 606a-d. Each of the MPDU delimiter fields 604a-d may include a EOF field 610, reserved field 612, MPDU Length Extension field 614, MPDU length field 616, cyclic redundancy check field 618, and a delimiter signature field 619. The MPDU delimiter format shown in FIG. 6 is just one possible example of the MPDU delimiter fields 604a-d. For example, in some implementations, the MPDU delimiter fields 604a-d may not include the MPDU length extension field 614.

An example format of the block acknowledgment messages 606a-d is also shown. In some aspects, the block acknowledgment MPDU's 606a-d may include a frame control field 620, duration field 622, receiver address field 624, transmitter address field 626, block acknowledgment control field 628, block acknowledgement information field 630, and a frame check sequence field 632. In some aspects, the receiver address field 624 may identify a device whose transmission is being acknowledged by the block acknowledgment message 606a-d. Other implementations may utilize block acknowledgment formats that vary from the example shown in FIG. 6.

As discussed above with respect to FIG. 4, in some aspects, a transmission opportunity (TXOP) owner may generate and transmit the example A-MPDU acknowledgment frame 600 to acknowledge a multi-user transmission, such as the multi-user transmission 410A-B shown in FIG. 4. For example, a first block acknowledgement in the A-MPDU 600, for example, block acknowledgment 606a, may identify the STA 120A via the receiver address field 624. For example, the receiver address field 624 of block acknowledgment 606a may identify the STA 120A by indicating STAs 120A media access control address. A second block acknowledgment within A-MPDU acknowledgment frame 600, for example, block acknowledgment 606b, may acknowledge a transmission from STA 120B. This may be accomplished in part, by identifying the STA 120B in the receiver address field 624 of Block acknowledgment 606b. When the A-MPDU acknowledgment frame 600 is used to acknowledge the multi-user transmission 410A-B shown in FIG. 4, the MPDU delimiter field 604c-d and the block acknowledgment fields 606c-d may not be present, as FIG. 4 shows only two devices transmitting during the example multi-user transmission 410A-B. In other implementations that include additional devices in a multi-user transmission, for example, 3, 4, 5, 6, 7, 8 or more devices participating in a multi-user transmission, then the A-MPDU acknowledgement frame 600 may include a MPDU delimiter field 604 and a block acknowledgment 606 identifying each of the additional devices participating in the multi-user transmission. The phy preamble 602 may include a scrambler seed field 651 in some aspects. In some of these aspects, the scrambler seed field may be used to communicate information relevant to the embodiments disclosed. For example, as discussed in more detail below, the scrambler seed field 651 may be used to store an indication of whether the A-MPDU 600 includes MPDU's addressed to multiple devices.

Figure 7:
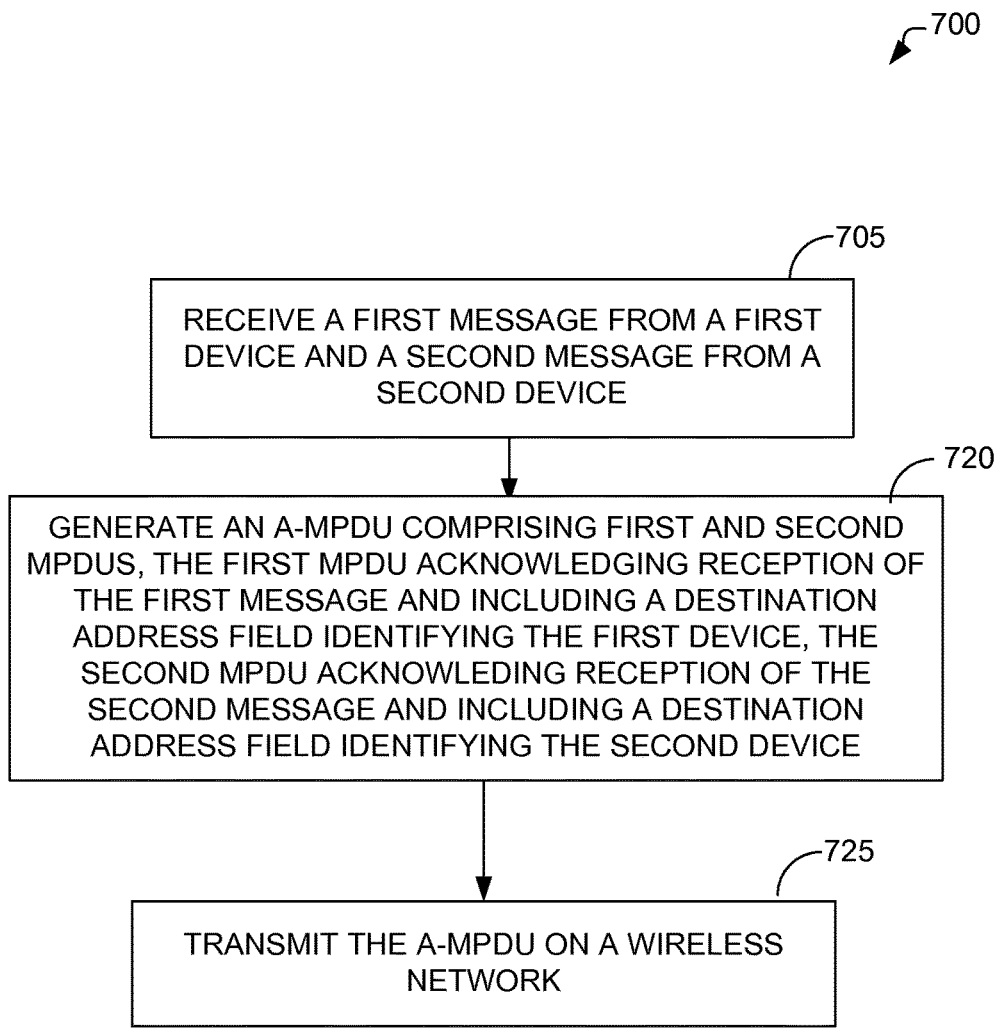
FIG. 7 is a flow chart of an aspect of an exemplary method for providing wireless communication.

FIG. 7 is a flow chart of an exemplary process 700 for wireless communication in accordance with certain embodiments described herein. In some aspects, the process 700 may be performed by the wireless device 302. For example, in some aspects, the memory 306 may store instructions that when executed by the processor 304, cause the processor 304 to perform one or more aspects of the process 700, described below. In some aspects, the process 700 is performed by a transmission opportunity owner device. For example, a transmission opportunity owner device transmitting the CTX frame 402 and block acknowledgments 470 shown in FIG. 4 may perform the process 700 in some aspects.

Process 700 provides one implementation for a receiver of transmissions from multiple users (e.g. a multi-user transmission in some aspects) to acknowledge the multiple devices participating in the transmission(s). In some aspects, multi-user transmissions may be most beneficial when the multi-user transmissions are of a particular length or longer. Below the particular length, there may be less benefit in performing multi-user transmissions. In the case of acknowledgment messages which tend to be shorter in length and therefore may be less efficient to transmit using multi-user transmissions, it may be more efficient in some aspects to transmit multiple block acknowledgments to multiple devices participating in a multi-user communication via an A-MPDU instead of using a multi-user transmission to acknowledge a received multi-user transmissions. In some other aspects, separate transmissions from separate different users may also be acknowledged via the A-MPDU described below.

In optional block 705, two or more transmissions from multiple users are received. In some aspects, the one or more transmissions are in the form of a multi-user transmission, such as a transmission using MU-MIMO or OFDMA to simultaneously transmit multiple messages from multiple users. In some aspects, the two or more transmissions (e.g. multi-user transmission) is an uplink transmission from a plurality of devices, for example, stations. The two or more transmissions may include at least a first message from a first device and a second message from a second device. In some aspects, the first message and second message may be transmitted and received at least partially simultaneously as part of a multi-user transmission. In some aspects, the first and second message discussed with respect to process 700 may correspond to the message 410A-B discussed above with respect to FIG. 4. Some embodiments of process 700 may not include reception of the first and second messages.

In some aspects, the two or more transmissions are received by a TXOP owner device, such as an access point. In some aspects, the first and second devices send uplink data to the transmission opportunity owner during the multi-user transmission. In some aspects, the multi-user transmission is received using multi-user multiple input, multiple output (MU-MIMO) or orthogonal frequency division multiplexing (OFDM). The multi-user message may be received, at least in part, by reading data from a receiver, such as receiver 312. For example, in some aspects, the processor 304 may receive data from the receiver 304 to accomplish block 705. In some aspects, one or more of the functions discussed with respect to block 705 may be performed by the receiver 312 and/or the processor 304.

In some aspects, before the two or more transmissions are received, a trigger message is generated and transmitted on the wireless network. The trigger message may comprise timing information or otherwise indicate when the two or more transmissions received in block 705 should be initiated by at least the first and second devices. For example, the timing information for when transmissions should be initiated may be indicated, in some aspects, in the "TX start time" field 548 of the CTX message 500, shown in FIG. 5.

In some aspects, the trigger message may be generated to include an indication of when acknowledgements for the two or more transmissions should be expected. For example, the trigger message may be generated to include a time reference for the acknowledgments. For example, in some aspects, the time reference for the acknowledgments will be the acknowledgment time reference field 550 shown in FIG. 5. In some aspects, the trigger message will be a CTX message, such as CTX message 402 discussed above with respect to FIG. 4. In some other aspects, the trigger message will be a message separate from the CTX message 402.

In block 720, an aggregated media access control protocol data unit (A-MPDU) is generated to include at least a first and a second MPDU. In some aspects, the A-MPDU is generated by the TXOP owner device discussed above. The first MPDU may acknowledge reception of the first message via particular values in a frame control field of the first MPDU. In some aspects, the first MPDU may substantially conform to the format of MPDUs 606*a-d* discussed above with respect to FIG. 6. For example, the frame control field of the first MPDU may indicate that the first MPDU is an acknowledgment or block acknowledgment in some aspects. In some aspects, the first MPDU includes a destination address field or receiver address field that identifies the first device, for example by indicating the first devices' unicast media access control address. Additionally, a frame control field may indicate that the first MPDU is an acknowledgment frame or a block acknowledgment frame. In some aspects, one or more of the functions discussed with respect to block 710 may be performed by the processor 304.

The second media access control protocol data unit (MPDU) acknowledges reception of the second message. The second MPDU may acknowledge the second message by having particular values in a frame control field. In some aspects, the second MPDU may substantially conform to the format of MPDUs 606*a-d* discussed above with respect to FIG. 6. For example, the frame control field of the second MPDU may indicate that the second MPDU is an acknowledgment or block acknowledgment in some aspects. In some aspects, the second MPDU includes a unicast destination address field or receiver address field that identifies the second device, for example by indicating the second devices' media access control address.

In some aspects, generating the A-MPDU may include copying the memory areas discussed above storing at least the data for the first and second MPDUs into an area of memory representing the A-MPDU. In some other aspects, each of the first and second MPDUs may be generated in areas of memory consistent with an A-MPDU format, so there is no need to copy the data. In some aspects, generating the A-MPDU may include setting additional A-MPDU fields in the computer memory. In some aspects, the A-MPDU generated in block 720 may substantially conform to the format of the A-MPDU 600 discussed above with respect to FIG. 6. For example, generating the A-MPDU may include initializing at least MPDU delimiter fields 604*a-b* as shown in FIG. 6.

In some aspects, the A-MPDU is generated to indicate whether the A-MPDU includes MPDUs destined or addressing at least two different devices. In some aspects, one or more of the EOF filed 610 and/or the reserved field 612 may function as the indicator. For example, in some aspects, a first MPDU delimiter (such as 604*a*) in the A-MPDU may include the EOF field and/or the reserved field 612, which may function as the indicator. In some other aspects, a scrambler seed field 651, typically in the physical header 602, may be used to store the indicator value. Since the A-MPDU includes the first MPDU, which is addressed to the first device, and a second MPDU, which is addressed to the second device, in some aspects the device generating the A-MPDU may set the indicator to a first value (for example, one (1)). In other cases where a generated A-MPDU contains only one MPDU or contains only MPDUs destined for the same device, the generating device may set the indicator to a second value (for example, zero (0)). In some aspects, one or more of the functions discussed with respect to block 720 may be performed by the processor 304.

In some aspects, one or more additional MPDUs may be generated and included in the A-MPDU by the transmission opportunity owner device. For example, if the multi-user transmission received in block 705 included messages from 3, 4, 5, 6, 7, 8 or more devices, the A-MPDU generated in block 720 may include an MPDU corresponding to each message (e.g. 3, 4, 5, 6, 7, 8, or more MPDUs), with each MPDU acknowledging one of the messages.

In block 725, the A-MPDU generated in block 720 is transmitted on a wireless network. In some aspects, transmitting the A-MPDU may include calling a network transmission API, and providing the API with at least a pointer to or a copy of the memory initialized above to the field values of the first and second MPDUs, and the A-MPDU as a whole.

In some aspects, the A-MPDU transmitted in block 725 corresponds to the block acknowledgments 470 discussed with respect to FIG. 4. In some aspects, one or more of the functions discussed with respect to block 725 may be performed by the transmitter 310 of FIG. 3. Alternatively, one or more of the functions discussed above with respect to block 725 may be performed by the processor 304.

Figure 8:
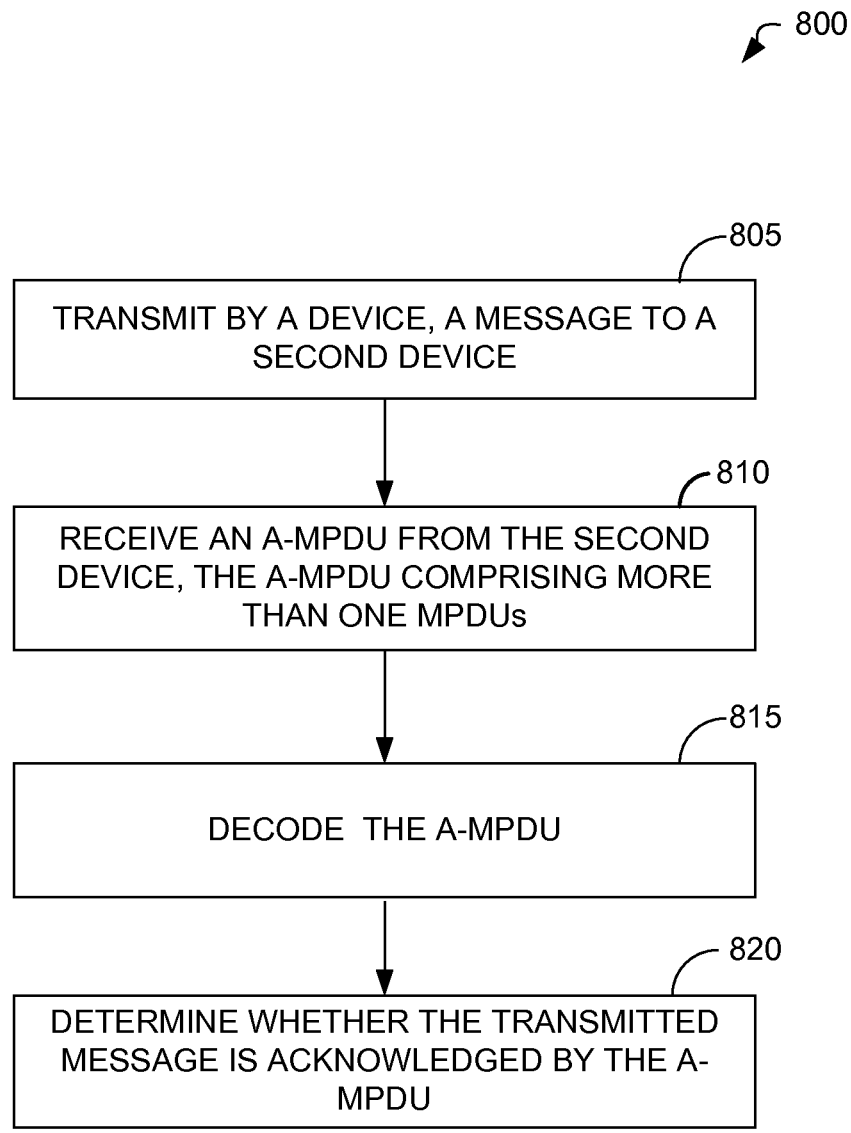
FIG. 8 is a flow chart of an aspect of an exemplary method for providing wireless communication.

FIG. 8 is a flow chart of an exemplary process 800 for wireless communication in accordance with certain embodiments described herein. In some aspects, the process 800 may be performed by the wireless device 302. For example, in some aspects, the memory 306 may store instructions that configure the processor 304 to perform one or more aspects of process 800. In some aspects, the process 800 is performed by a device communicating with a transmission opportunity owner during a transmission opportunity. For example a device transmitting data to a transmission opportunity owner as part of a multi-user transmission (e.g. using MU-MIMO or OFDM) may perform the process 800.

Process 800 may enable a transmitter of a message to obtain an acknowledgment of the message transmission. In some aspects, multi-user transmissions may be most beneficial when the multi-user transmissions are of a particular length or longer. Below the particular length, there may be less benefit in performing multi-user transmissions. In the case of acknowledgment messages which tend to be shorter in length and therefore may be less efficient to transmit using multi-user transmissions, it may be more efficient in some aspects to transmit multiple block acknowledgments to multiple devices participating in a multi-user communication via an A-MPDU instead of using a multi-user transmission to acknowledge the multi-user transmissions.

In optional block 805, a message is transmitted by a first device to a second device. In some aspects, the second device may be an access point. In some aspects, the second device may be a transmission opportunity owner. In some aspects, the transmitted message is a portion of a multi-user transmission. For example, the message may be transmitted at least partially concurrently with a second message from a third device. The second message may also be transmitted by the third device to the second device. For example, the message transmitted in block 805 may correspond to either message 410A or message 410B transmitted by user terminals 120A-B respectively and described with respect to FIG. 4. In some aspects, the message is transmitted using multi-user multiple input multiple output (MU-MIMO) or orthogonal frequency division multiplexing (OFDM). Transmission of the message may not be part of block 805 or process 800 generally in some aspects. Some aspects of process 800 may not include transmission of the message to the second device.

In some aspects, control information, such as spatial channel and/or frequency assignments necessary to perform the MU-MIMO or OFDM transmission may be received from the second device. For example, in some aspects, the first device may receive another message from the second device that indicates the control information. In some aspects, this message may be a CTX message, such as CTX message 402 discussed above with respect to FIG. 4 and/or the message 500 discussed in FIG. 5. In some other aspects, the other message may be a trigger message, with the trigger message providing timing information that indicates when the transmission of block 805 should be initiated, and/or may include control information that defines how the transmission should be performed (such as spatial channel or frequency assignments for the transmission). For example, the other message may include the TX start time field 548, which provides a time reference for when the transmission of the message should be initiated. In some aspects, the control information includes an indication of when an acknowledgment for the message transmitted in block 805 should be expected. For example, in some aspects, the message may include the acknowledgment time reference field 550, shown in FIG. 5. In some aspects, the first device may enter a sleep state based on the timing indication. In some aspects, the sleep state may be entered before receiving the aggregated media access control protocol data unit. For example, in some aspects the control information may include a time reference for when an acknowledgement for the message transmitted in block 805 should be expected. The first device may enter a sleep state in response to the control information, but return to an awake state, such that it can receive acknowledgment at a time indicated by the control information.

In some aspects, transmitting the message to the second device includes setting a destination address of the message to an address identifying the second device (for example, a station address of the second device), and calling an application programming interface (API), such as a network "send" API, to transmit the message. In some aspects, one or more of the functions discussed above with respect to block 805 may be performed by the transmitter 310 and/or the processor 304.

In block 810, an aggregated media access control protocol data unit (A-MPDU) is received from the second device. In some aspects, the A-MPDU received in block 810 may include the block acknowledgments 470 described above with respect to FIG. 4. In some aspects, receiving the A-MPDU may include transferring data comprising the A-MPDU from the receiver 312 to the memory 306 via the processor 304. In some aspects, one or more of the functions discussed above with respect to block 810 may be performed by the receiver 312 and/or the processor 304.

In block 815, the A-MPDU is decoded by the first device. In some aspects, the decoding may identify two or more media access control protocol data units (MPDUs). In some aspects, decoding the A-MPDU to identify the two or more media access control protocol data units may including parsing the A-MPDU to identify MPDU delimiters, such as any one or more of delimiter fields 604a-d of FIG. 6. The decoding may also include parsing the data following an identified delimiter based on a format of an MPDU, such as the format of any of MPDUs 606a-d shown in FIG. 6.

The MPDUs are at least partially decoded to determine whether each of the MPDUs identify the first device. For example, the MPDU's may identify the first device if they include a station address of the first device in a destination address or receiver address field of the MPDU. In some aspects, the decoded MPDUs may each substantially conform with the MPDUs 606a-d discussed above with respect to FIG. 6. For example, a receiver address field, such as receiver address field 624, of each of the MPDUs may be decoded to determine if the receiver address field contains data identifying the first device. For example, the receiver address field may include the unicast media access control address of the first device in some aspects, thus identifying the MPDU as destined for the first device.

In some aspects, the A-MPDU may be decoded to determine how multiple MPDUs within the A-MPDU should be processed. In some aspects, this determination may correspond with whether the A-MPDU is acknowledging multiple transmissions. In some aspects, this determination may be based on an explicit indicator included in the A-MPDU. For example, in some aspects, one or more of the EOF field 610 and/or reserved field 612 of a first MPDU delimiter in a frame (such as MPDU delimiter 604a in FIG. 6) included in the A-MPDU may function as the indicator. In some other aspects, the indicator may be decoded from a scrambler seed field 651, typically in the physical header 602. In aspects including the indicator, decoding of the two media access control protocol data units (MPDUs) may be conditioned on the indicator. For example, if the indicator has a first value (for example, one (1)), the device may be configured to decode a receiver or destination address field (such as receiver address field 624) in each MPDU included in the A-MPDU. If a particular MPDU is addressed to the first device, then data in the MPDU may be processed by the first device. If a particular MPDU does not address the first device, for example, by not identifying the first device in a destination or receiver address field of the MPDU, then the data included in the MPDU may not be processed by the first device but instead may be ignored by the first device.

If the explicit indicator has a second value (such as zero (0)), the first device may determine each of the MPDUs in the A-MPDU are all addressed to the same device. In this case, the device may only decode the first MPDU in the A-MPDU to determine if the first MPDU is addressed to the first device (for example, via a receiver address field 624 which may be in a frame control field of an MPDU 604). Data in each of the MPDUs may then be processed based on whether the first device is addressed by the first MPDU. For example, if the first MPDU is addressed to the first device, the first device may process data in each of the MPDUs as if each of the MPDUs are also addressed to the first device. Alternatively, if the first MPDU does not address the first device, all of the MPDU data in the A-MPDU may be ignored by the first device, as if each of the MPDUs are all addressed to other devices. In some aspects, one or more of the functions discussed above with respect to block 815 may be performed by the processor 304.

In some aspects, the first device does not rely on an explicit indicator as discussed above to determine whether the A-MPDU is acknowledging a multi-user transmission and two MPDUs should be decoded to determine whether either of the MPDUs is addressing the first device. Instead, the first device may maintain state information indicating an acknowledgment for the multi-user transmission transmitted in block 805 is outstanding. Based on this state information, the first device may decode each of two of the MPDUs in the A-MPDU to determine if the decoded MPDUs identify the first device when the acknowledgment is outstanding. When the state information does not indicate an acknowledgment of a multi-user transmission is outstanding, the first device may decode A-MPDUs differently. For example, the first device may only decode the first MPDU receiver address in an A-MPDU. The first device may then assume that the remaining MPDUs address or are destined for the first device identified in the first MPDU. For example, if the first MPDU is addressed to the first device, data associated with each of the MPDUs may then be processed by the first device. If the first MPDU does not address the first device, none of the data in the MPDU may be processed by the first device in some aspects.

Block 820 determines whether the message transmitted in block 805 is acknowledged by the A-MPDU. Whether the transmitted message is acknowledged may be indicated by one of the MPDU's decoded in block 815. For example, if one of the MPDUs identifies the device via a destination or receiver address field, and has a type/subtype field in a frame control field indicating the MPDU is an acknowledgment or a block acknowledgement message, then the first device may determine the message transmitted in block 805 is acknowledged by the MPDU. If the first device determines the message transmitted in block 805 is acknowledged, the first device may for example, remove the message itself (or data defining the message) from an internal retransmission queue. If the first device determines the message transmitted in block 805 is not acknowledged, the message transmitted in block 805, or data defining the message, may be maintained on a retransmission queue, so that it can be retransmitted if needed. Moreover, if the message of block 805 is acknowledged, the first device may prepare a second message for transmission, whereas if the message of block 805 remains unacknowledged, the second message may be delayed in its transmission. In some aspects, one or more of the functions discussed above with respect to block 820 may be performed by the processor 304.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure may be devised without departing from the basic scope thereof, and the scope thereof is determined by the claims that follow.

What is claimed is:

1. A method of acknowledging transmissions from a first device and a second device to a third device on a wireless network, the method comprising:
    transmitting, by the third device, a trigger message including a time reference for transmitting, from the third device, an aggregated media access control protocol data unit;
    in response to transmitting the trigger message, receiving, at the third device, a first message from the first device and a second message from the second device;
    in response to receiving the first and second messages, generating, by the third device, the aggregated media access control protocol data unit including
        a first media access control protocol data unit acknowledging reception of the first message and including a first destination address field identifying the first device,
        a second media access control protocol data unit acknowledging reception of the second message and including a second destination address field identifying the second device, and
        an indication that the aggregated media access control protocol data unit includes more than one media access control protocol data unit having different destination address fields; and
    transmitting, by the third device, the aggregated media access control protocol data unit on the wireless network in accordance with the time reference included in the trigger message.

2. The method of claim 1, further comprising receiving a multi-user transmission including the first message and the second message.

3. The method of claim 2, wherein the multi-user transmission uses multi-user multiple input multiple output.

4. The method of claim 2, wherein the multi-user transmission uses orthogonal frequency division multiplexing.

5. The method of claim 1, further comprising receiving a third message from a fourth device, wherein the aggregated media access control protocol data unit is generated to further include a third media access control protocol data unit acknowledging reception of the third message and including a third destination address field identifying the fourth device.

6. The method of claim 1, wherein the third device is an access point.

7. The method of claim 1, wherein the trigger message is a clear to transmit (CTX) message.

8. The method of claim 1, wherein the first device and the second device are stations and the third device is an access point.

9. An apparatus for acknowledging transmissions from a first device and a second device on a wireless network, the apparatus comprising:
    a transmitter configured to transmit a trigger message including a time reference for transmitting, from the apparatus, an aggregated media access control protocol data unit;
    a receiver configured to receive, in response to transmitting the trigger message, a first message from the first device and a second message from the second device; and
    a processor configured to:
        in response to receiving the first and second messages, generate the aggregated media access control protocol data unit including
            a first media access control protocol data unit acknowledging reception of the first message and including a first destination address field identifying the first device,
            a second media access control protocol data unit acknowledging reception of the second message and including a second destination address field identifying the second device, and
            an indication that the aggregated media access control protocol data unit includes more than one media access control protocol data unit having different destination address fields,
    the transmitter being further configured to transmit the aggregated media access control protocol data unit on the wireless network in accordance with the time reference included in the trigger message.

10. The apparatus of claim 9, wherein the receiver is further configured to receive the first message and the second message in a multi-user transmission.

11. The apparatus of claim 10, wherein the multi-user transmission uses multi-user multiple input multiple output.

12. The apparatus of claim 10, wherein the multi-user transmission uses orthogonal frequency division multiplexing.

13. The apparatus of claim 9, wherein the receiver is further configured to receive a third message from a third device, and the processor is further configured to generate the aggregated media access control protocol data unit to further include a third media access control protocol data unit, the third media access control protocol data unit acknowledging reception of the third message and including a third destination address field identifying the third device.

14. The apparatus of claim 9, wherein the apparatus is an access point.

15. The apparatus of claim 9, wherein the trigger message is a clear to transmit (CTX) message.

16. The apparatus of claim 9, wherein the first device and the second device are stations and the apparatus is an access point.

17. An apparatus for acknowledging transmissions from a first device and a second device on a wireless network, the apparatus comprising:

a processor coupled with a memory comprising instructions that when executed cause the processor to perform:
means for transmitting, by the apparatus, a trigger message including a time reference for transmitting an aggregated media access control protocol data unit;
means for receiving, at the apparatus and in response to transmitting the trigger message, a first message from the first device and a second message from the second device;
means for generating, in response to receiving the first and second messages, the aggregated media access control protocol data unit comprising
a first media access control protocol data unit acknowledging reception of the first message and including a first destination address field identifying the first device,
a second media access control protocol data unit acknowledging reception of the second message and including a second destination address field identifying the second device, and
an indication that the aggregated media access control protocol data unit includes more than one media access control protocol data unit having different destination address fields; and
means for transmitting the aggregated media access control protocol data unit on the wireless network in accordance with the time reference included in the trigger message.

18. A non-transitory computer readable storage medium comprising instructions that when executed cause a processor to perform a method of acknowledging transmissions from a first device and a second device to a third device on a wireless network, the method comprising:
transmitting, by the third device, a trigger message including a time reference for transmitting, from the third device, an aggregated media access control protocol data unit;
in response to transmitting the trigger message, receiving, at the third device, a first message from the first device and a second message from the second device;
in response to receiving the first and second messages, generating, by the third device, the aggregated media access control protocol data unit comprising
a first media access control protocol data unit acknowledging reception of the first message and including a first destination address field identifying the first device,
a second media access control protocol data unit acknowledging reception of the second message and including a second destination address field identifying the second device, and
an indication that the aggregated media access control protocol data unit includes more than one media access control protocol data unit having different destination address fields; and
transmitting, by the third device, the aggregated media access control protocol data unit on the wireless network in accordance with the time reference included in the trigger message.

19. The computer readable storage medium of claim 18, further comprising receiving a multi-user transmission including the first message and the second message.

20. The computer readable storage medium of claim 19, wherein the multi-user transmission uses multi-user multiple input multiple output.

21. The computer readable storage medium of claim 19, wherein the multi-user transmission uses orthogonal frequency division multiplexing.

22. The computer readable storage medium of claim 18, the method further comprising receiving a third message from a fourth device, wherein the aggregated media access control protocol data unit is generated to include a third media access control protocol data unit acknowledging reception of the third message.

23. The computer readable storage medium of claim 18, wherein the third device is an access point.

24. The computer readable storage medium of claim 18, wherein the trigger message is a clear to transmit (CTX) message.

25. The computer readable storage medium of claim 18, wherein the first device and the second device are stations and the third device is an access point.

26. A method of wireless communication, comprising:
decoding, by a first device, a trigger message to determine a time reference for receiving an aggregated media access control protocol data unit from a second device;
in response to decoding the trigger message, transmitting, at the first device, a first message to the second device;
receiving, by the first device, in accordance with the time reference, the aggregated media access control protocol data unit from the second device, wherein the aggregated media access control protocol data unit includes
a first media access control protocol data unit acknowledging reception of the first message and including a first destination address field identifying the first device,
a second media access control protocol data unit acknowledging reception of a second message and including a second destination address field identifying a third device, and
an indication that the aggregated media access control protocol data unit includes more than one media access control protocol data unit having different destination address fields;
decoding, by the first device, the aggregated media access control protocol data unit; and
determining, by the first device, that the aggregated media access control protocol data unit is acknowledging the transmission of the first message based on the decoding of the aggregated media access control protocol data unit.

27. The method of claim 26, further comprising transmitting the first message to the second device in a multi-user transmission.

28. The method of claim 27, wherein the multi-user transmission uses multi-user multiple input multiple output.

29. The method of claim 27, wherein the multi-user transmission uses orthogonal frequency division multiplexing.

30. The method of claim 26, further comprising determining whether the first device is unicast addressed in the aggregated media access control protocol data unit, and determining the message is acknowledged in response to the first device being unicast addressed in the media access control protocol data unit.

31. The method of claim 26, further comprising entering a sleep state before the receiving of the aggregated media access control protocol data unit based on the time reference.

32. The method of claim 31, wherein the trigger message is a clear to transmit (CTX) message.

33. The method of claim 26, wherein the first device is a station and the second device is an access point.

34. An apparatus for wireless communication, comprising:
- a processor configured to decode a trigger message to determine a time reference for receiving an aggregated media access control protocol data unit from a first device; a transmitter configured to, in response to decoding the trigger message, transmit a first message to the first device;
- a receiver configured to receive the aggregated media access control protocol data unit from the first device, in accordance with the time reference, wherein the aggregated media access control protocol data unit includes
  - a first media access control protocol data unit acknowledging reception of the first message and including a first destination address field identifying the apparatus,
  - a second media access control protocol data unit acknowledging reception of a second message and including a second destination address field identifying a second device, and
  - an indication that the aggregated media access control protocol data unit includes more than one media access control protocol data unit having different destination address fields;
- wherein the processor is further configured to:
  - decode the aggregated media access control protocol data unit, and
  - determine that the aggregated media access control protocol data unit is acknowledging the transmission of the first message based on the decoding of the aggregated media access control protocol data unit.

35. The apparatus of claim 34, wherein the transmitter is further configured to transmit the first message as part of a multi-user transmission.

36. The apparatus of claim 35, wherein the multi-user transmission uses multi-user multiple input multiple output.

37. The apparatus of claim 35, wherein the multi-user transmission uses orthogonal frequency division multiplexing.

38. The apparatus of claim 34, wherein the processor is further configured to determine whether the apparatus is unicast addressed in the aggregated media access control protocol data unit, and determine the message is acknowledged in response to the apparatus being unicast addressed in the media access control protocol data unit.

39. The apparatus of claim 34, wherein the processor is further configured to enter a sleep state before the receiving of the aggregated media access control protocol data unit based on the time reference.

40. The apparatus of claim 34, wherein the trigger message is a clear to transmit (CTX) message.

41. The apparatus of claim 34, wherein the apparatus is a station and the first device is an access point.

42. An apparatus for wireless communication, comprising:
- a processor coupled with a memory comprising instructions that when executed cause the processor to perform:
- means for decoding a trigger message to determine a time reference for receiving, from a first device, an aggregated media access control protocol data unit;
- means for transmitting, in response to decoding the trigger message, a first message to the first device;
- means for receiving, at the apparatus, the aggregated media access control protocol data unit, in accordance with the time reference, wherein the aggregated media access control protocol data unit includes
  - a first media access control protocol data unit acknowledging reception of the first message and including a first destination address field identifying the apparatus,
  - a second media access control protocol data unit acknowledging reception of a second message and including a second destination address field identifying a second device, and
  - an indication that the aggregated media access control protocol data unit includes more than one media access control protocol data unit having different destination address fields; means for decoding the aggregated media access control protocol data unit; and
- means for determining that the aggregated media access control protocol data unit is acknowledging the transmission of the first message based on the decoding of the aggregated media access control protocol data unit.

43. A non-transitory computer readable storage medium comprising instructions that when executed cause a processor to perform a method of wireless communication, the method comprising:
- decoding, by a first device, a trigger message to determine a time reference for receiving an aggregated media access control protocol data unit from a second device;
- in response to decoding the trigger message, transmitting, at the first device, a first message to the second device;
- receiving, by a first device, in accordance with the time reference, the aggregated media access control protocol data unit from the second device, wherein the aggregated media access control protocol data unit includes
  - a first media access control protocol data unit acknowledging reception of the first message and including a first destination address field identifying the first device,
  - a second media access control protocol data unit acknowledging reception of a second message and including a second destination address field identifying a third device, and
  - an indication that the aggregated media access control protocol data unit includes more than one media access control protocol data unit having different destination address fields;
- decoding the aggregated media access control protocol data unit; and
- determining that the aggregated media access control protocol data unit is acknowledging the transmission of the first message based on the decoding of the aggregated media access control protocol data unit.

44. The computer readable storage medium of claim 43, the method further comprising transmitting the first message in a multi-user transmission.

45. The computer readable storage medium of claim 44, wherein the multi-user transmission uses multi-user multiple input multiple output.

46. The computer readable storage medium of claim 44, wherein the multi-user transmission uses orthogonal frequency division multiplexing.

47. The computer readable storage medium of claim 43, the method further comprising determining whether the first device is unicast addressed in the aggregated media access control protocol data unit, and determining the message is acknowledged in response to the first device being unicast addressed in the media access control protocol data unit.

48. The computer readable storage medium of claim 43, the method further comprising entering a sleep state before the receiving of the aggregated media access control protocol data unit based on the time reference.

49. The computer readable medium of claim 48, wherein the trigger message is a clear to transmit (CTX) message.

50. The computer readable medium of claim of claim 43, wherein the first device is a station and the second device is an access point.

* * * * *